US008625710B2

(12) United States Patent
Damnjanovic et al.

(10) Patent No.: US 8,625,710 B2
(45) Date of Patent: Jan. 7, 2014

(54) RESOURCE BLOCK MAPPING FOR CROSS-CARRIER ASSIGNMENTS

(75) Inventors: Aleksandar Damnjanovic, Del Mar, CA (US); Juan Montojo, San Diego, CA (US); Jelena M. Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 13/029,901

(22) Filed: Feb. 17, 2011

(65) Prior Publication Data

US 2012/0045014 A1 Feb. 23, 2012

Related U.S. Application Data

(60) Provisional application No. 61/305,838, filed on Feb. 18, 2010.

(51) Int. Cl.
  *H04L 27/00* (2006.01)
(52) U.S. Cl.
  USPC ........... 375/295; 375/260; 375/267; 375/299; 375/349; 370/203; 370/208
(58) Field of Classification Search
  USPC ................ 375/260, 267, 295, 299, 347, 349; 370/203–211
  See application file for complete search history.

(56) References Cited

U.S. PATENT DOCUMENTS

2010/0061345 A1* 3/2010 Wengerter et al. ............ 370/335
2010/0238886 A1* 9/2010 Sambhwani et al. ......... 370/329

FOREIGN PATENT DOCUMENTS

WO  WO2010129812 A2  11/2010
WO  WO2011039575 A1  4/2011

OTHER PUBLICATIONS

International Search Report and Written Opinion—PCT/US2011/025507, ISA/EPO—Jul. 21, 2011.
LG Electronics Inc: "PCFICH False Detection in Cross-Carrier Scheduling", 3GPP Draft; R1-100641-PCFICH_CA_LGE, 3rd Generation Partnership Project (3GPP), Mobile Competence Centre ; 650, Route Des Lucioles ; F-06921 Sophia-Antipolis Cedex ; France, vol. RAN WGI, no Valencia, Spain; 20100118, Jan. 12, 2010, XP050418241.
Qualcomm Incorporated: "PCFICH for Multicarrier Operation", 3GPP Draft; R1-100671 PCFICH for MC, 3rd Generation Partnership Project (3GPP), Mobile Competence Centre ; 650, Route Des Lucioles ; F-06921 Sophia-Antipolis Cedex ; France, vol. RAN WGI, no Valencia, Spain; 20100118, Jan. 12, 2010, XP050418264.

* cited by examiner

*Primary Examiner* — Curtis Odom
(74) *Attorney, Agent, or Firm* — Steven A. Raney

(57) ABSTRACT

Methods and apparatuses are provided for cross-carrier decoding and mapping of data and control information in a wireless communication system.

28 Claims, 8 Drawing Sheets

RESOURCE BLOCK MAPPING FOR CROSS-CARRIER ASSIGNMENTS

RELATED APPLICATIONS

The present Application for Patent claims priority to U.S. Provisional Patent Application No. 61/305,838, entitled "Resource Block Mapping for Cross-Carrier Assignments," filed Feb. 18, 2010, and assigned to the assignee hereof and hereby expressly incorporated herein by reference.

TECHNICAL FIELD

Embodiments of the present invention relate to wireless communication systems in general and, more particularly, to cross-carrier resource mapping in multi-carrier wireless communication systems.

BACKGROUND

This section is intended to provide a background or context to the disclosed embodiments. The description herein may include subject matter that could be pursued, but which has not necessarily been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

In conventional wireless networks, data and control signals are confined to the same carrier. In these systems, a wireless terminal can decode the control information in a downlink carrier to determine which of the data resources transmitted on the carrier are allocated to the wireless terminal. The wireless terminal also uses the control information to determine the uplink resources that have been granted to the wireless terminal by the base station serving the wireless terminal. For example, in Release 8 of the 3GPP (Third Generation Partnership Project) LTE (Long Term Evolution) standard, each subframe of the downlink carrier includes a physical downlink control channel (PDCCH) and a physical downlink shared data channel (PDSDCH). The PDCCH includes a control format indicator (CFI), in a downlink control format indicator channel (PDCFICH) at the beginning of the subframe, that identifies the duration of the PDCCH by the number of symbols it occupies in the time domain. Using this information, the wireless terminal knows where the control channel ends and the data channel begins.

SUMMARY

Disclosed embodiments include methods, apparatuses and articles of manufacture for decoding control format information for a first carrier from a data channel of a second carrier, where the control format information specifies a number of symbols, N, comprising a control channel of the first carrier, where N has a minimum value of Nmin and a maximum value of Nmax, decoding symbols from a transport block of the first carrier, from an $(Nmax+1)^{th}$ symbol of the transport block through a last symbol of the transport block, and decoding symbols from the transport block of the first carrier in reverse order from an $(Nmax)^{th}$ symbol to an $(Nmin+1)^{th}$ symbol of the transport block.

Other disclosed embodiments further include methods, apparatuses and articles of manufacture for transmitting an acknowledgment of the control format information, where the acknowledgment includes an indication that the control format information has been decoded, interpreting symbols (N+1) through the last symbol of the transport block as data, and interpreting symbols 1 through N of the transport block as control information.

Yet other disclosed embodiments include methods, apparatuses and articles of manufacture for transmitting control format information for a first carrier in a data channel of a second carrier, where the control format information specifies a number of symbols, N, comprising a control channel of the first carrier, where N has a minimum value of Nmin and a maximum value of Nmax, and transmitting transport blocks on the first carrier, where symbols (N+1) through a last symbol of each transport block are encoded with data, and symbols (Nmin+1) through N are not encoded.

Other disclosed embodiments further include methods, apparatuses and articles of manufacture for receiving an acknowledgement indicating that the control format information has been decoded by a wireless terminal, transmitting transport blocks on the first carrier, where symbols (Nmin+1) through N of each transport block are encoded with data when the value of N is less than a previous value of N, and transmitting transport blocks on the first carrier, where symbols (Nmin+1) through N of each transport block are encoded with control information when the value of N is greater than the previous value of N.

BRIEF DESCRIPTION OF THE DRAWINGS

Various aspects of the present disclosure are illustrated by way of example, and not of limitation, in the figures of the accompanying drawings in which.

DETAILED DESCRIPTION

Figure 1:
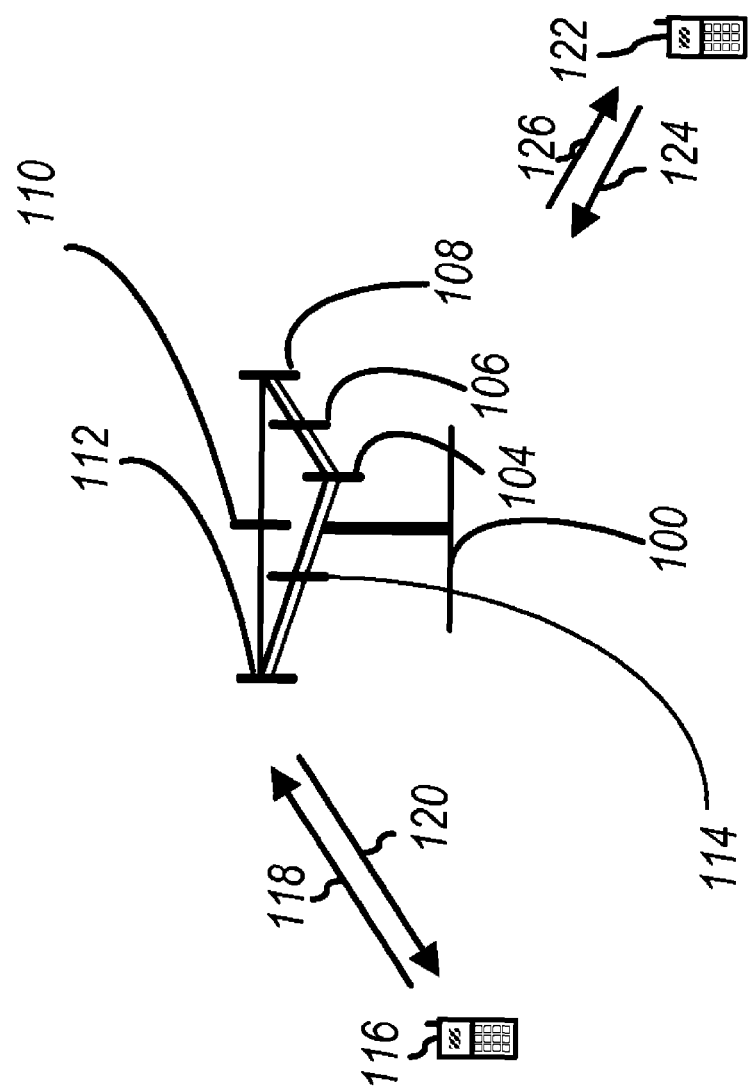
FIG. 1 illustrates a wireless network in one embodiment.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links

118, 120, 124 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omnidirectionally through a single antenna to all its user equipment.

Figure 2:
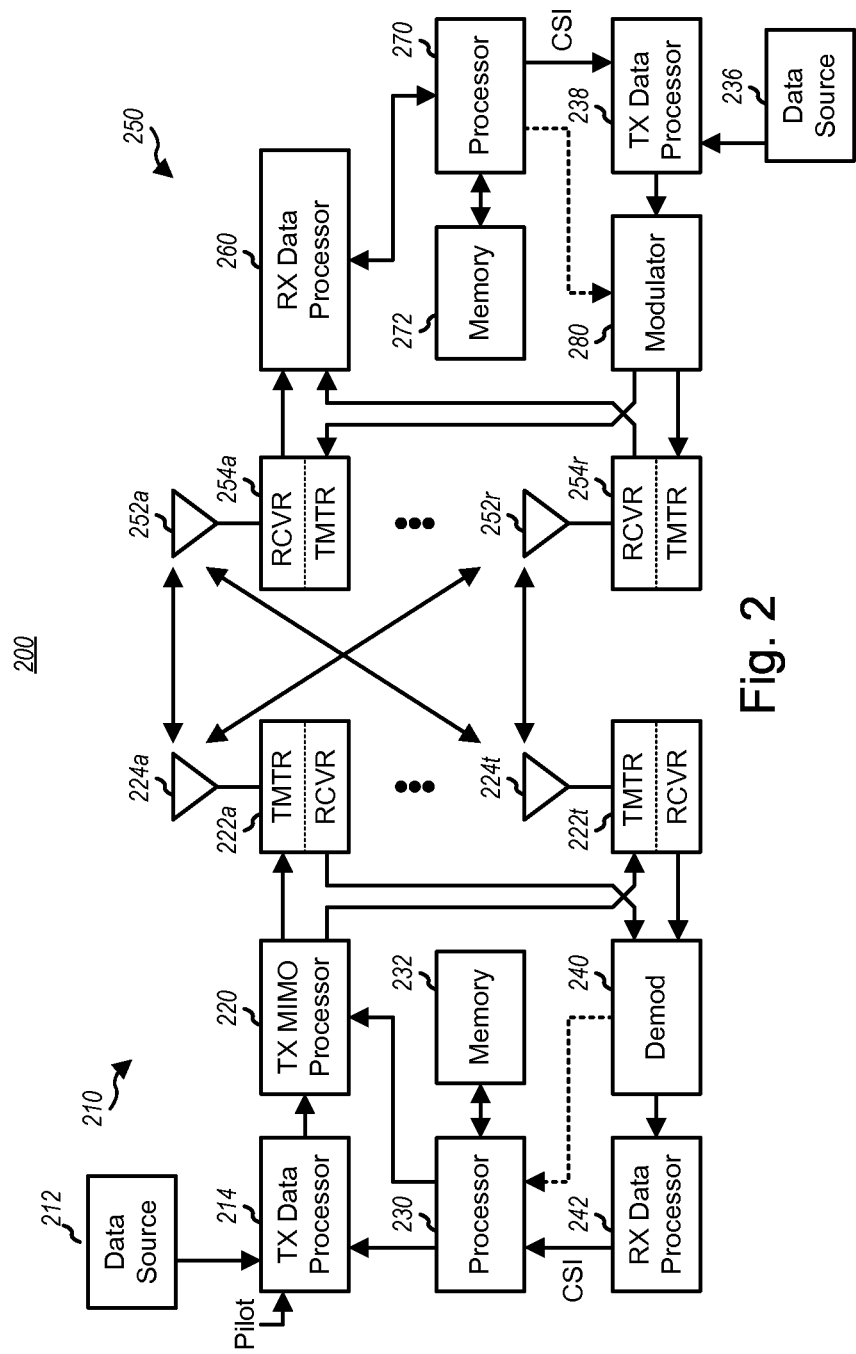
FIG. 2 is a block diagram illustrating a wireless communication system.

FIG. 2 illustrates a block diagram of an exemplary communication system which may accommodate various aspect of the present disclosure. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

Figure 3:
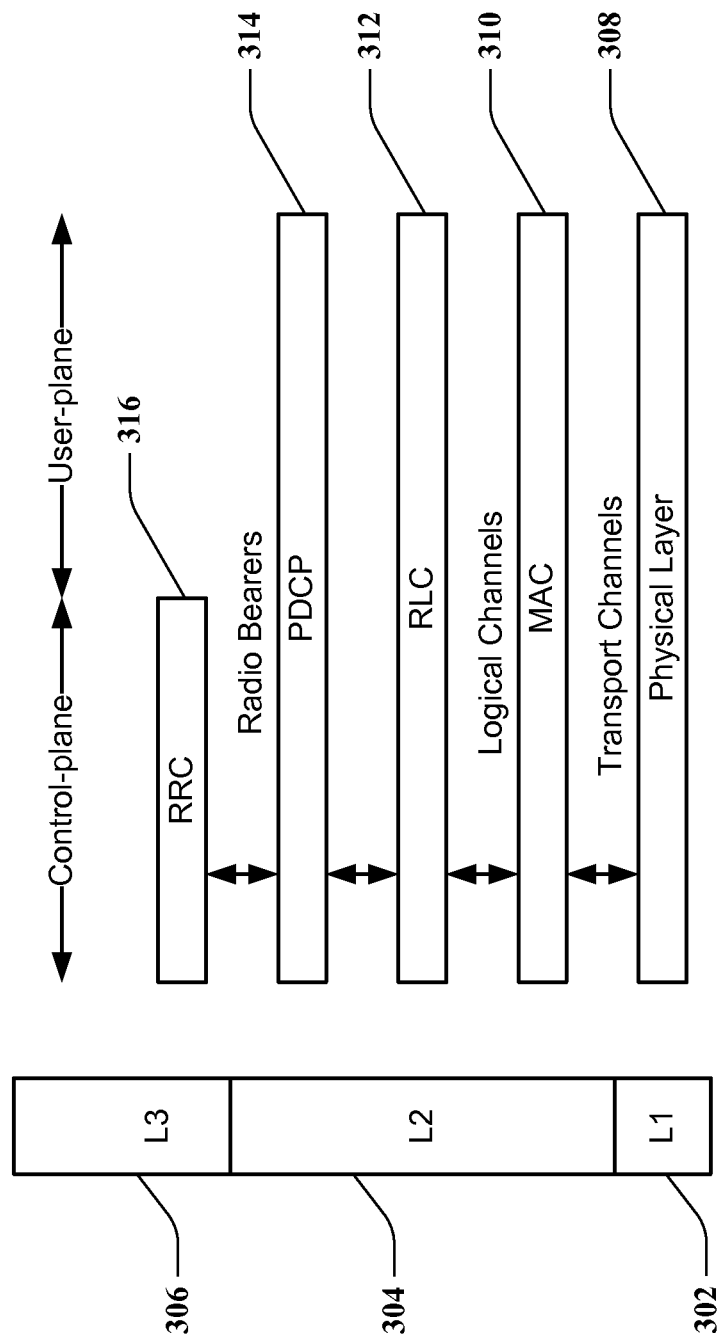
FIG. 3 illustrates an exemplary radio protocol architecture.

A radio protocol architecture may take on various forms depending on the particular application. An exemplary radio protocol architecture for an LTE system is illustrated in FIG. 3. In FIG. 3, the radio protocol architecture for the UE and eNodeB is shown as having three layers: Layer 1, Layer 2, and Layer 3. Layer 1 (L1) 302 is the lowest layer and implements various physical layer signal processing functions. Layer 1 will be referred to herein as the physical layer 302. Layer 2 (L2) 304 is above the physical layer 302 and is responsible for the link between the UE and eNodeB over the physical layer 302.

In the user plane, the L2 layer 304 includes a media access control (MAC) sublayer 310, a radio link control (RLC) sublayer 312, and a packet data convergence protocol (PDCP) sublayer 314, which are terminated at the eNodeB on the network side. Although not shown, the UE may have several sublayers above the L2 layer 304 including a network layer (e.g., an IP layer) and an application layer.

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between eNodeBs. The RLC sublayer 312 provides segmentation and reassembly of upper layer data packets, retransmission of lost data packets, and reordering of data packets to compensate for out-of-order reception due to hybrid automatic repeat request (HARQ). The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

In the control plane, the radio protocol architecture for the UE and eNodeB is substantially the same for the physical layer 308 and the L2 layer 304 with the exception that there is no header compression function for the control plane. The control plane also includes a radio resource control (RRC) sublayer 316 in Layer 3 (L3) 306. The RRC sublayer 316 is responsible for obtaining radio resources (i.e., radio bearers) and for configuring the lower layers using RRC signaling between the eNodeB and the UE.

Figure 4:
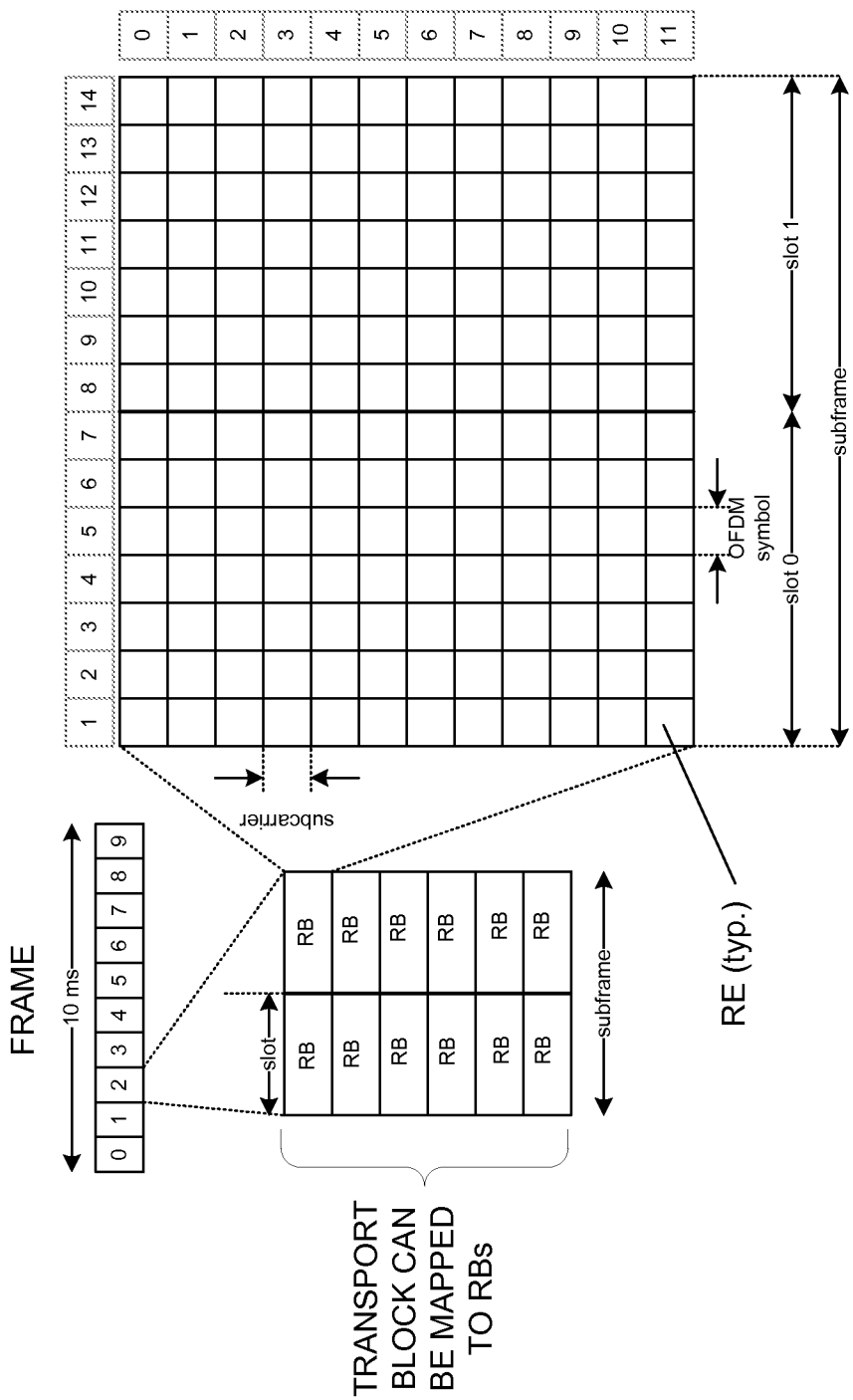
FIG. 4 illustrates an exemplary radio frame structure.

Various frame structures may be used to support the DL and UL transmissions. An exemplary DL frame structure used in LTE Rel-8 is illustrated in FIG. 4. Those skilled in the art will appreciate that the frame structure for any particular application may be different depending on any number of factors, including the applicable wireless standard and allowed variations therein. In this example, a 10 ms frame is divided into 10 equally sized sub-frames, and each sub-frame includes two consecutive time slots.

A resource grid illustrates the two time slots, where each time slot comprises a number of resource block (RBs), sometimes referred to as physical resource blocks (PRBs). The number of resource blocks in a sub-frame depends on the system bandwidth, and can vary between 6 (as illustrated in FIG. 4) and 110 for LTE Rel-8. Wider bandwidths are proposed for LTE-A. As shown, a transport block can be mapped to RBs in the exemplary DL frame structure.

The resource grid is further divided into multiple resource elements (REs). In LTE, a resource block contains 12 consecutive subcarriers in the frequency domain and, for a normal cyclic prefix in each OFDM symbol, 7 consecutive OFDM symbols in the time domain, for a total of 84 resource elements. When an extended cyclic prefix is used (e.g., based on channel conditions), the number of OFDM symbols per resource block is reduced to 6 and the number of resource elements per resource block is reduced to 72. The number of bits carried by each resource element depends on the modulation scheme (e.g., 2 bits for QPSK, 4 bits for 16-QAM and 6 bits for 64-QAM).

Figure 5:
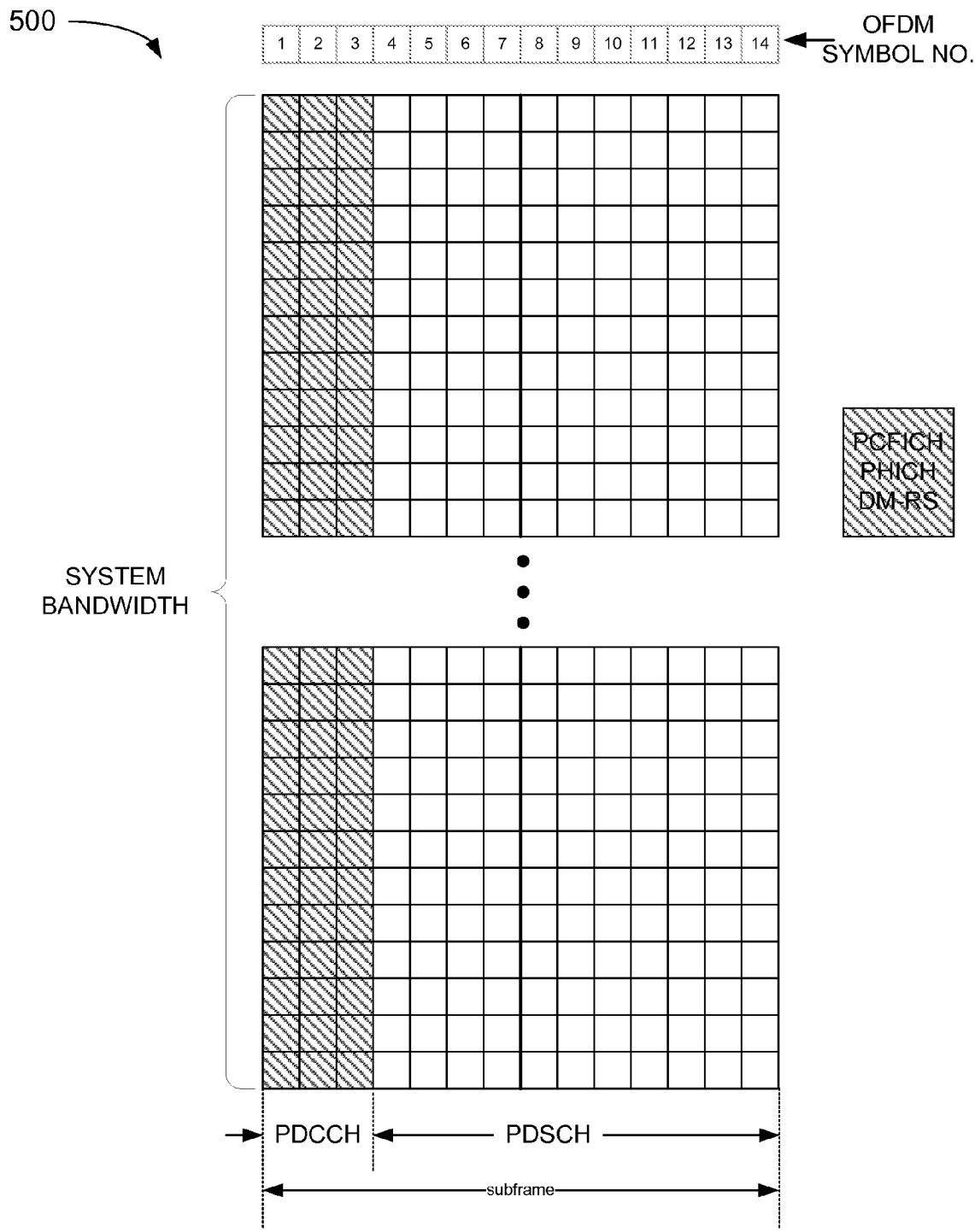
FIG. 5 illustrates an exemplary time/frequency resource allocation.

For purposes of the following discussion, an exemplary time/frequency resource allocation 500 is shown in FIG. 5. The exemplary resource allocation 500 is provided for convenience and ease of discussion alone, and embodiments disclosed and claimed herein are not so limited. As illustrated in FIG. 5, a sub-frame includes 14 OFDM symbols numbered 1 to 14 spanning the full system bandwidth. In this arrangement, one transport block can be transmitted in one transmission time interval corresponding to one sub-frame.

The initial OFDM symbols comprise the physical downlink control channel (PDCCH) that carries downlink control information (DCI). The UE decodes the DCI to determine which RBs in the data portion (physical downlink shared channel, PDSCH) are allocated to the UE, either on a dedicated basis or in common with other UEs. In addition to the DCI, the PDCCH includes a physical control format indicator channel (PCFICH) in the first OFDM symbol, extending over the full system bandwidth. A coded control format indicator (CFI) in the PCFICH indicates the number of OFDM symbols used for the PDCCH, so that the UE knows when the control channel ends and the data channel begins. For LTE Rel-8, the number of OFDM symbols used for the transmission of the PDCCH is 1, 2, or 3 if the system bandwidth is greater than 10 resource blocks, and 2, 3, or 4 if the system bandwidth is between 6 and 10 resource blocks. However, embodiments contemplated herein are not so limited. The PDCCH also includes the physical hybrid automatic repeat request indicator channel (PHICH), and demodulation reference signals (DM-RS). The rest of the allocation comprises the physical downlink shared data channel (PDSCH).

In LTE-Advanced (LTE-A), a UE may be capable of receiving multiple carriers with cross-carrier resource allocations. For example, a UE may be configured to receive carrier A and carrier B. If the PCFICH for carrier A is unreliable (e.g., due to high levels of interference or fading), it may be desirable to transmit control information for both carrier A and carrier B on carrier B.

In one aspect of the present disclosure, the CFI for carrier A is included in the data channel (PDSCH) of carrier B, which can be conveyed by layer 3 RRC signaling. In another aspect, the CFI for carrier A is conveyed through the conventional PCFICH on carrier A (for UEs that can correctly decode the CFI from the PCFICH on carrier A) and also on carrier B with RRC signaling in the data channel of carrier B (for UEs that cannot decode the CFI from the PCFICH on carrier A).

Changes in the CFI are asynchronous and can occur from sub-frame to sub-frame. When the CFI is transmitted in the conventional manner, using the PCFICH on the carrier that is being scheduled, the UE decodes the symbols of a sub-frame in the order they are received, starting at the first OFDM symbol (symbol 1) in slot 0 of the sub-frame, through to the end of the sub-frame. After the first OFDM symbol is decoded, the UE knows how many OFDM symbols are used for the PDCCH and where the PDSCH begins. That is, if the PDCCH occupies 1 OFDM symbol (symbol 1), then the PDSCH begins at OFDM symbol 2. If the PDCCH occupies 2 OFDM symbols (symbols 1 and 2), the PDSCH begins at OFDM symbol 3. If the PDCCH occupies 3 OFDM symbols (symbols 1, 2 and 3), the PDSCH begins at OFDM symbol 4. If the system bandwidth is less than 10 RBs wide, then the size of the PDCCH can be 2, 3 or 4 OFDM symbols with the PDSCH beginning at symbol 3, 4 or 5 respectively.

In one embodiment of a multi-carrier system, an eNodeB may transmit a PCFICH for a carrier A in a conventional manner in the first OFDM symbol of a transport block of carrier A. If the UE receives and correctly decodes the PCFICH for carrier A on carrier A, then processing of the carrier A transport block can continue normally. However, if the UE cannot decode the PCFICH on carrier A, it may be configured to decode a CFI for carrier A from the data channel of a transport block of carrier B, where the CFI in the data channel may be signaled by the RRC layer of the eNodeB.

However, in this scenario, the UE and the eNodeB may be out of synchronization if the CFI signaled in the data channel of carrier B represents a change in the current size of the control channel for carrier A (either an increase or a decrease). The eNodeB could stop transmitting to the UE on carrier A until it received an acknowledgement from the UE that the new CFI value had been decoded. At that point, the eNodeB could continue transmitting to the UE using carrier A with a synchronized control channel size where the UE knows where the control channel ends and the data channel begins in the transport blocks of carrier A. Otherwise, the UE might decode data as control information, corrupting the control information, or decode control information as data, corrupting the data. However, halting transmission on carrier A while waiting for the acknowledgement from the UE may not be desirable as it would reduce throughput.

In one aspect of the present disclosure, to maximize throughput, the UE and the eNodeB may implement a set of rules that allow continuous transmission and reception with only a minor degradation. Assume, for example, that the UE has been previously configured by the eNodeB to expect a control channel size of N OFDM symbols and the eNodeB and the UE are synchronized. Now assume that the eNodeB signals a new control channel size N' (N prime) for carrier A in the data channel of carrier B. Rather than wait to receive an acknowledgement from the UE, the present disclosure allows the eNodeB to continue transmitting with certain restrictions.

For the following discussion, for clarity, a LTE Rel-8 subframe structure using a short cyclic prefix is assumed (FIG. 5). In this structure, there are 14 OFDM symbols numbered 1-14, such that the cardinal numbering (1-14) matches the ordinal numbering ($1^{st}$-$14^{th}$)

Assume that the UE and the eNodeB are synchronized at N=2 (i.e., OFDM symbols 1 and 2 comprise the control channel and OFDM symbols 3-14 comprise the data channel). If N'=3 (i.e., N'>N), the eNodeB signals the new value on carrier B but continues to transmit transport blocks on carrier A with a control channel consisting of 2 OFDM symbols (symbols 1 & 2). The eNodeB transmits data on OFDM symbols 4-14, leaving OFDM symbol 3 unpopulated, until it receives an acknowledgement from the UE that the UE has decoded the new CFI value (N') and knows the correct size of the control channel and the data channel on carrier A. At that point, the eNodeB can begin to populate OFDM symbol 3 with control information, knowing that it will be interpreted correctly by the UE In this scenario, where the UE and eNodeB are initially synchronized at N=2 and the eNodeB signals a change from N=2 to N'=3 (N'>N), the UE behaves as follows. When the UE decodes the new CFI value from the data channel of carrier B, it sends an acknowledgement to the eNodeB and begins to decode subsequent carrier A transport blocks using a non-sequential order. Assume, for this discussion, a system bandwidth for which the maximum size of the control channel on carrier A is Nmax=3. When the CFI value increases (from 2 to 3), the UE begins to decode the transport block starting from the (Nmax+1)th OFDM symbol (OFDM symbol 4 in this example) all the way to the last OFDM symbol in the transport block (symbol 14). The UE then returns to the (Nmax)th symbol (symbol 3) and decodes symbols 3, 2 and 1 in that order (the transport blocks may be stored in a buffer where they can be decoded in any order). This order for decoding guarantees that the initial symbols to be decoded are actually data symbols (and demodulation reference signals), rather than noise, and results in better decoding The UE next attempts to decode symbols 1, 2 and 3 as control channel symbols. However, because symbol 3 is initially unpopulated by the eNodeB (until it receives the ACK from the UE), symbol 3 will decode as noise and the signal-to-noise ratio of the control channel will be somewhat degraded—but the control channel will not be corrupted. Using the new CFI value (N'), the UE will interpret symbols 4-14 as data. As described above, the data transmitted by the eNodeB will be confined to symbols 4-14, so the data will be correctly decoded.

The operation is different if N'<N. Assume, for example, that the UE and the eNodeB are synchronized at N=2 (i.e., OFDM symbols 1 and 2 comprise the control channel and OFDM symbols 3-14 comprise the data channel, as above). If N'=1 (i.e., N'<N), the eNodeB signals the new value on carrier B and transmits transport blocks on carrier A in an allocation for which the control channel consists of 1 OFDM symbol (symbol 1). The eNodeB may transmit data on OFDM symbols 3-14 (leaving OFDM symbol 2 unpopulated) until it receives an acknowledgement from the UE that the UE has decoded the new CFI value (N') and knows the correct size of the control channel and the data channel on carrier A. At that point, the eNodeB can populate OFDM symbol 2 with data, knowing that it will be interpreted correctly by the UE.

In this scenario, where the UE and eNodeB are initially synchronized at N=2 and the eNodeB signals a change from N=2 to N'=1 (N'<N), the UE behaves as follows. When the UE decodes the new CFI value from the data channel of carrier B, it sends an acknowledgement to the eNodeB and begins to decode subsequent carrier A transport blocks using a non-sequential order, as described above. Assume again that the maximum size of the control channel on carrier A is Nmax=3. When the CFI value decreases (from 2 to 1), the UE begins to decode the transport block starting from the (Nmax+1)th OFDM symbol (OFDM symbol 4 in this example, as described above) all the way to the last OFDM symbol in the transport block (symbol 14). The UE then returns to the (Nmax)th symbol (symbol 3) and decodes symbols in the reverse order 3, 2 and 1 (as before, the transport blocks can be stored in a buffer and can be read in any order).

The UE will attempt to decode symbol 1 as control information and symbols 2 and 3 as data symbols. As described above, the control channel will be confined to symbol 1 by the eNodeB when it signals the change in CFI, so the UE will correctly interpret symbol 1 as control information. Using the new CFI value (N'=1), the UE will attempt to decode symbols 2-14 as data. However, because symbols 2 and 3 are initially unpopulated by the eNodeB (until it receives the ACK from the UE), symbols 2 and 3 will decode as noise and the signal-to-noise ratio of the data channel will be somewhat degraded—but the data channel will not be corrupted.

An alternative to the RRC signaling described above is to puncture the PDSCH data on carrier B at a predetermined OFDM symbol and to replace the punctured data with the CFI for carrier A. For example, the CFI may be punctured on a predetermined resource element (e.g., the $4^{th}$ OFDM symbol in a transport block).

Figure 6:
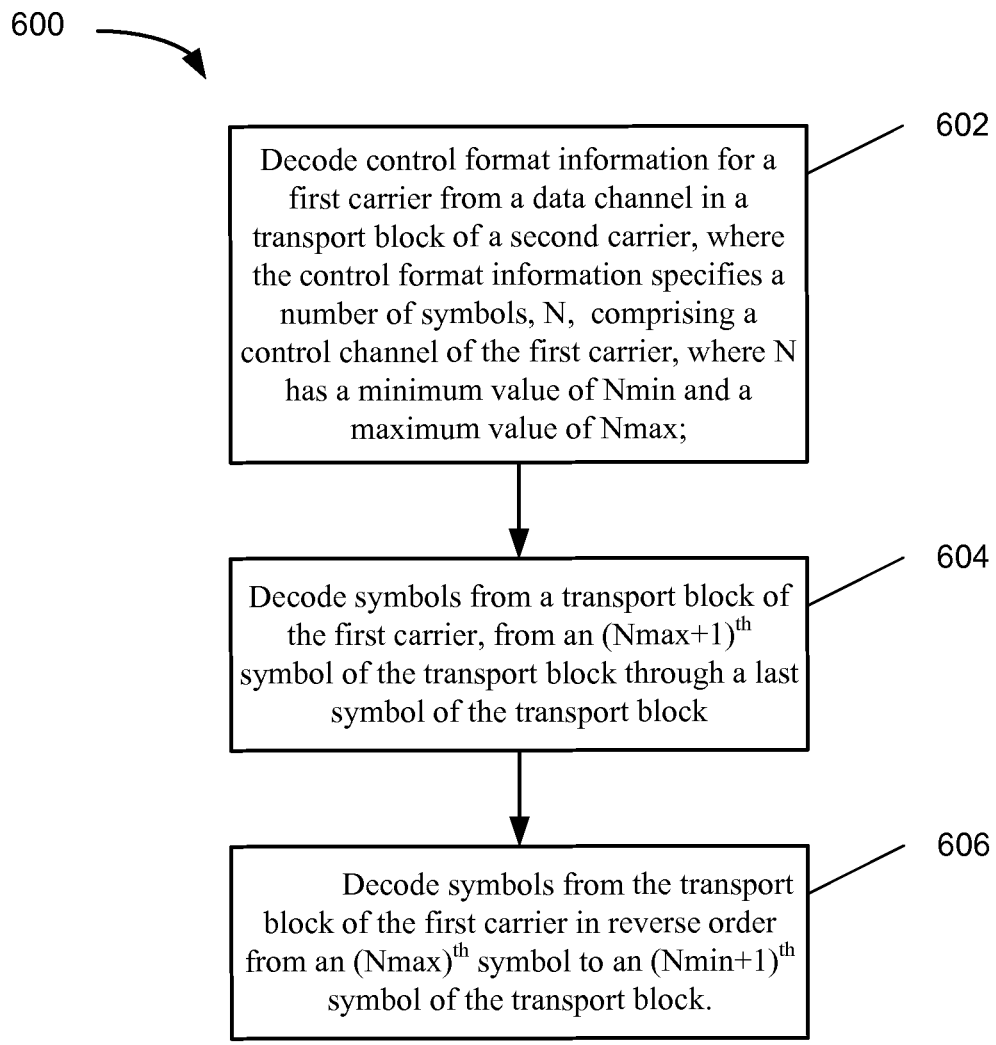
FIG. 6 is a flowchart illustrating an exemplary method which can be performed by a user equipment.

FIG. 6 is a flowchart illustrating a method 600 in a UE according to one embodiment. In FIG. 6, the method 600 begins at operation 602, where control format information for a first carrier is decoded from a data channel in a transport block of a second carrier, where the control format information specifies a number of symbols, N, comprising a control channel of the first carrier, where N has a minimum value of Nmin and a maximum value of Nmax. The method continues at operation 604, where symbols from a transport block are decoded from the first carrier, from an (Nmax+1)$^{th}$ symbol of the transport block through a last symbol of the transport block. The method concludes at operation 606, where symbols from the transport block of the first carrier are decoded in reverse order from an (Nmax)th symbol to an (Nmin+1)th symbol of the transport block.

Figure 7:
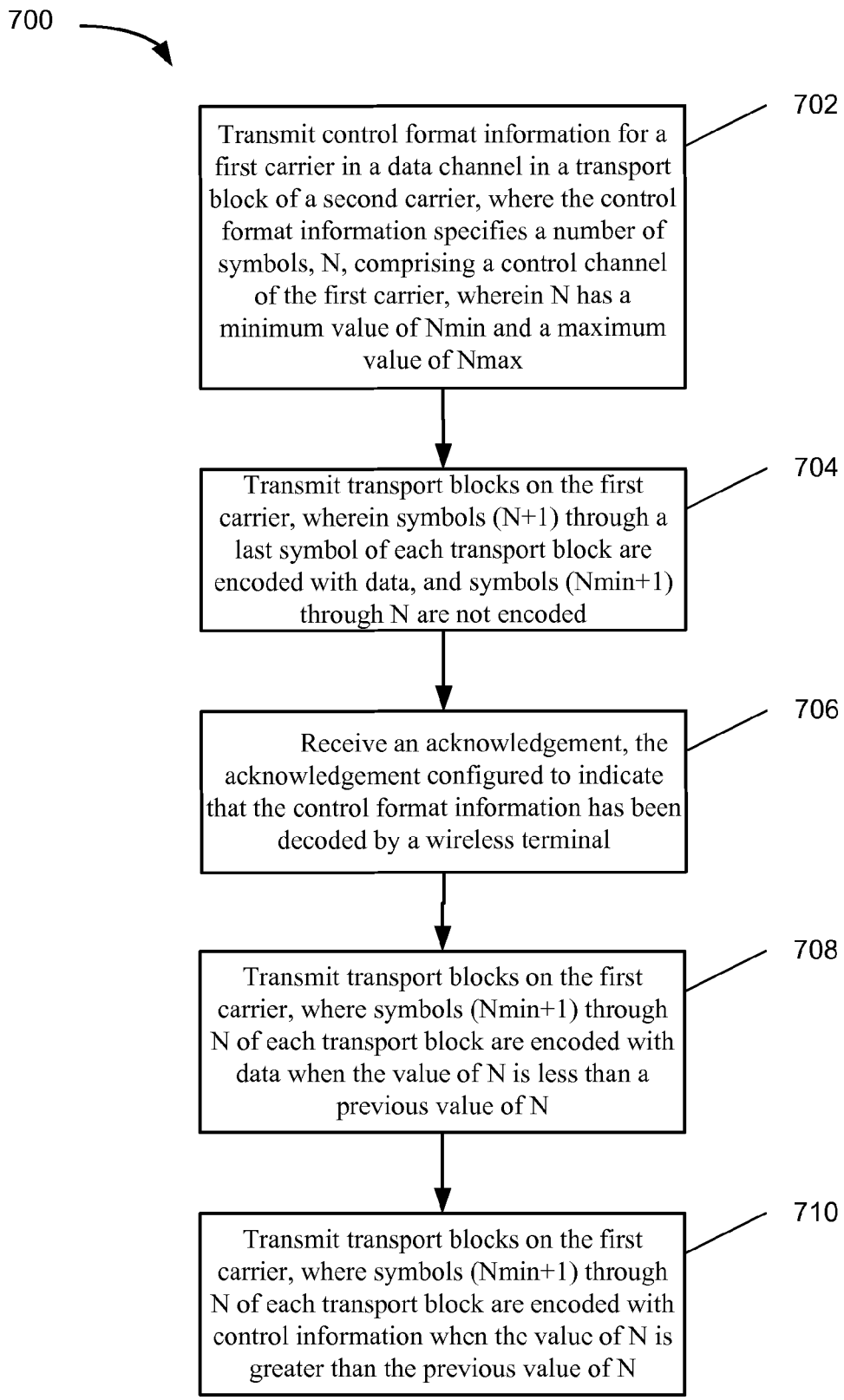
FIG. 7 is a flowchart illustrating an exemplary method which can be performed by a base station.

FIG. 7 is a flowchart illustrating a method 700 in an eNodeB according to one embodiment. In FIG. 7, the method 700 begins at operation 702, where control format information for a first carrier is transmitted in a data channel in a transport block of a second carrier, where the control format information specifies a number of symbols, N, comprising a control channel of the first carrier, where N has a minimum value of Nmin and a maximum value of Nmax. The method continues at operation 704, where transport blocks are transmitted on the first carrier, where symbols (N+1) through a last symbol of each transport block are encoded with data, and symbols (Nmin+1) through N are not encoded. Next, at operation 706, the eNodeB receives an acknowledgement, where the acknowledgement is configured to indicate that the control format information has been decoded by a wireless terminal. At operation 708, the eNodeB transmits transport blocks on the first carrier, where symbols (Nmin+1) through N of each transport block are encoded with data when the value of N is less than a previous value of N or, at operation 710, the eNodeB transmits on the first carrier, where symbols (Nmin+1) through N are encoded with control information when the value of N is greater than the previous value of N.

Figure 8:
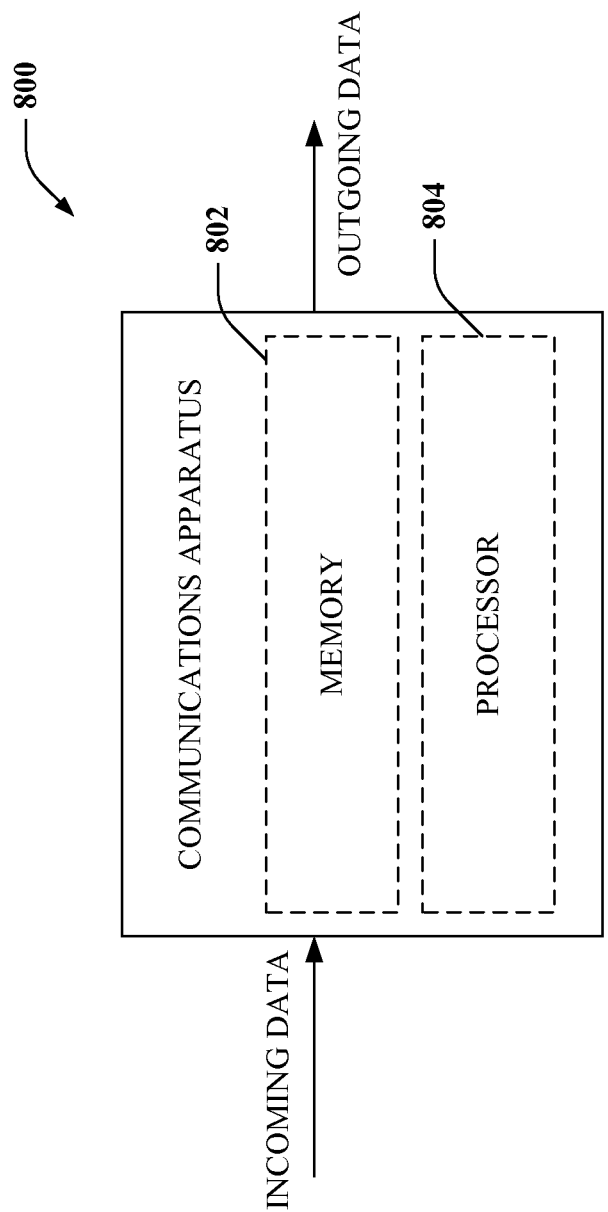
FIG. 8 illustrates an exemplary communications apparatus.

FIG. 8 illustrates an apparatus 800 in which the various disclosed embodiments may be implemented. In particular, the apparatus 800 that is shown in FIG. 8 may comprise at least a portion of a base station or at least a portion of a user equipment and/or at least a portion of a transmitter system or a receiver system (such as the transmitter system 210 and the receiver system 250 that are depicted in FIG. 2). The apparatus 800 that is depicted in FIG. 8 can be resident within a wireless network and receive incoming data via, for example, one or more receivers and/or the appropriate reception and decoding circuitry (e.g., antennas, transceivers, demodulators and the like). The apparatus 800 that is depicted in FIG. 8 can also transmit outgoing data via, for example, one or more transmitters and/or the appropriate encoding and transmission circuitry (e.g., antennas, transceivers, modulators and the like). Additionally, or alternatively, the apparatus 800 that is depicted in FIG. 8 may be resident within a wired network.

FIG. 8 further illustrates that the apparatus 800 can include a memory 802 that can retain instructions for performing one or more operations, such as signal conditioning, analysis and the like. Additionally, the apparatus 800 of FIG. 8 may include a processor 804 that can execute instructions that are stored in the memory 802 and/or instructions that are received from another device. The instructions can relate to, for example, configuring or operating the apparatus 800 or a related communications apparatus. It should be noted that while the memory 802 that is depicted in FIG. 8 is shown as a single block, it may comprise two or more separate memories that constitute separate physical and/or logical units. In addition, the memory while being communicatively connected to the processor 804, may reside fully or partially outside of the apparatus 800 that is depicted in FIG. 8.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the systems and apparatus described herein can be employed with a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment. In the alternative, the processor and the storage medium may reside as discrete components in a user equipment. Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method in a wireless terminal, comprising:
decoding control format information for a first carrier from a data channel of a second carrier, wherein the control format information specifies a number of symbols, N, comprising a control channel of the first carrier, wherein N has a minimum value of Nmin and a maximum value of Nmax;
decoding symbols from a transport block of the first carrier, from an (Nmax+1)th symbol of the transport block through a last symbol of the transport block; and
decoding symbols from the transport block of the first carrier in reverse order from an (Nmax)th symbol to an (Nmin+1)th symbol of the transport block.

2. The method of claim 1, further comprising transmitting an acknowledgment of the control format information including an indication that the control format information has been decoded.

3. The method of claim 1, further comprising interpreting symbols (N+1) through the last symbol of the transport block as data.

4. The method of claim 1, further comprising interpreting symbols 1 through N of the transport block as control information.

5. The method of claim 1, wherein the control format information comprises a control format indicator (CFI) signaled by a radio resource control (RRC) layer.

6. A method in a base station, comprising:
transmitting control format information for a first carrier in a data channel in a transport block of a second carrier, wherein the control format information specifies a number of symbols, N, comprising a control channel of the first carrier, wherein N has a minimum value of Nmin and a maximum value of Nmax; and
transmitting transport blocks on the first carrier, wherein, when the value of N is less than a previous value of N (Npre), symbols (Npre+1) through a last symbol of each transport block are encoded with data, and symbols (N+1) through Npre are not encoded, and wherein, when the value of N is greater than the value of Npre, symbols (N+1) through a last symbol of each transport block are encoded with data, and symbols (Npre+1) through N are not encoded.

7. The method of claim 6, further comprising:
receiving an acknowledgement indicating that the control format information has been decoded by a wireless terminal;
transmitting transport blocks on the first carrier, wherein symbols (N+1) through Npre of each transport block are encoded with data when the value of N is less than the value of Npre; and
transmitting transport blocks on the first carrier, wherein symbols (Npre+1) through N of each transport block are encoded with control information when the value of N is greater than the value of Npre.

8. A wireless terminal, comprising:
means for decoding control format information for a first carrier from a data channel of a second carrier, wherein the control format information specifies a number of symbols, N, comprising a control channel of the first carrier, wherein N has a minimum value of Nmin and a maximum value of Nmax;
means for decoding symbols from a transport block of the first carrier, from an $(Nmax+1)^{th}$ symbol of the transport block through a last symbol of the transport block; and
means for decoding symbols from the transport block of the first carrier in reverse order from an $(Nmax)^{th}$ symbol to an $(Nmin+1)^{th}$ symbol of the transport block.

9. The wireless terminal of claim 8, further comprising means for transmitting an acknowledgment of the control format information, the acknowledgment including an indication that the control format information has been decoded.

10. The wireless terminal of claim 8, further comprising means for interpreting symbol (N+1) through the last symbol of the transport block as data.

11. The wireless terminal of claim 8, further comprising means for interpreting symbol 1 through N of the transport block as control information.

12. The wireless terminal of claim 8, wherein the control format information comprises a control format indicator (CFI) signaled by a radio resource control (RRC) layer.

13. A base station, comprising:
means for transmitting control format information for a first carrier in a data channel of a second carrier, wherein the control format information specifies a number of symbols, N, comprising a control channel of the first carrier, wherein N has a minimum value of Nmin and a maximum value of Nmax; and
means for transmitting transport blocks on the first carrier, wherein, when the value of N is less than a previous value of N (Npre), symbols (Npre+1) through a last symbol of each transport block are encoded with data, and symbols (N+1) through Npre are not encoded, and wherein, when the value of N is greater than the value of Npre, symbols (N+1) through a last symbol of each transport block are encoded with data, and symbols (Npre+1) through N are not encoded.

14. The base station of claim 12, further comprising:
means for receiving an acknowledgement indicating that the control format information has been decoded by a wireless terminal;
means for transmitting transport blocks on the first carrier, wherein symbols (N+1) through Npre of each transport block are encoded with data when the value of N is less than the value of Npre; and
means for transmitting transport blocks on the first carrier, wherein symbols (Npre+1) through N of each transport block are encoded with control information when the value of N is greater than the value of Npre.

15. An apparatus, comprising:
a processor; and
a memory comprising processor executable instructions that, when executed by the processor, configures the apparatus to:
decode control format information for a first carrier from a data channel of a second carrier, wherein the control format information specifies a number of symbols, N, comprising a control channel of the first carrier, wherein N has a minimum value of Nmin and a maximum value of Nmax;
decode symbols from a transport block of the first carrier, from an (Nmax+1)th symbol of the transport block through a last symbol of the transport block; and
decode symbols from the transport block of the first carrier in reverse order from an (Nmax)th symbol to an (Nmin+1)th symbol of the transport block.

16. The apparatus of claim 15, further comprising processor executable instructions that, when executed by the processor, configure the apparatus to transmit an acknowledgment of the control format information, the acknowledgment including an indication that the control format information has been decoded.

17. The apparatus of claim 15, further comprising processor executable instructions that, when executed by the processor, configure the apparatus to interpret symbols (N+1) through the last symbol of the transport block as data.

18. The apparatus of claim 15, further comprising processor executable instructions that, when executed by the processor, configure the apparatus to interpret symbols 1 through N of the transport block as control information.

19. The apparatus of claim 15, wherein the control format information comprises a control format indicator (CFI) signaled by a radio resource control (RRC) layer.

20. A apparatus, comprising:
a processor; and
a memory comprising processor executable instructions that, when executed by the processor, configures the apparatus to:
transmit control format information for a first carrier in a data channel of a second carrier, wherein the control format information specifies a number of symbols, N, comprising a control channel of the first carrier, wherein N has a minimum value of Nmin and a maximum value of Nmax; and
transmit transport blocks on the first carrier, wherein, when the value of N is less than a previous value of N (Npre), symbols (Npre+1) through a last symbol of each transport block are encoded with data, and symbols (N+1) through Npre are not encoded, and wherein, when the value of N is greater than the value of Npre, symbols (N+1) through a last symbol of each transport block are encoded with data, and symbols (Npre+1) through N are not encoded.

21. The apparatus of claim 20, further comprising processor executable instructions that, when executed by the processor, configures the apparatus to:
receive an acknowledgement indicating that the control format information has been decoded by a wireless terminal;
transmit transport blocks on the first carrier, wherein symbols (N+1) through Npre of each transport block are encoded with data when the value of N is less than the value of Npre; and
transmit transport blocks on the first carrier, wherein symbols (Npre+1) through N of each transport block are encoded with control information when the value of N is greater than the value of Npre.

22. An article of manufacture, comprising a non-transitory machine-readable medium having instructions therein that, when executed by a machine, configure the machine to:
decode control format information for a first carrier from a data channel of a second carrier, wherein the control format information specifies a number of symbols, N, comprising a control channel of the first carrier, wherein N has a minimum value of Nmin and a maximum value of Nmax;
decode symbols from a transport block of the first carrier, from an (Nmax+1)th symbol of the transport block through a last symbol of the transport block; and
decode symbols from the transport block of the first carrier in reverse order from an (Nmax)th symbol to an (Nmin+1)th symbol of the transport block.

23. The article of manufacture of claim 22, further comprising instructions that configure the machine to transmit an acknowledgment of the control format information, the acknowledgment including an indication that the control format information has been decoded.

24. The article of manufacture of claim 22, further comprising instructions that configure the machine to interpret symbols (N+1) through the last symbol of the transport block as data.

25. The article of manufacture of claim 22, further comprising instructions that configure the machine to interpret symbols 1 through N of the transport block as control information.

26. The article of manufacture of claim 22, wherein the control format information comprises a control format indicator (CFI) signaled by a radio resource control (RRC) layer.

27. An article of manufacture, comprising a non-transitory machine-readable medium having instructions therein that, when executed by a machine, configure the machine to:
transmitting control format information for a first carrier in a data channel of a second carrier, wherein the control format information specifies a number of symbols, N, comprising a control channel of the first carrier, wherein N has a minimum value of Nmin and a maximum value of Nmax; and
transmitting transport blocks on the first carrier, wherein, when the value of N is less than a previous value of N (Npre), symbols (Npre+1) through a last symbol of each transport block are encoded with data, and symbols (N+1) through Npre are not encoded, and wherein, when the value of N is greater than the value of Npre, symbols (N+1) through a last symbol of each transport block are encoded with data, and symbols (Npre+1) through N are not encoded.

28. The article of manufacture of claim 27, further comprising instructions that configure the machine to:
receive an acknowledgement indicating that the control format information has been decoded by a wireless terminal;
transmit transport blocks on the first carrier, wherein symbols (N+1) through Npre of each transport block are encoded with data when the value of N is less than the value of Npre; and
transmit transport blocks on the first carrier, wherein symbols (Npre+1) through N of each transport block are encoded with control information when the value of N is greater than the value of Npre.

* * * * *